United States Patent
Arce

(10) Patent No.: US 10,308,355 B2
(45) Date of Patent: Jun. 4, 2019

(54) HUB MOUNTED VIBRATION SUPPRESSION SYSTEM

(71) Applicant: Moog Inc., East Aurora, NY (US)

(72) Inventor: Arturo M. Arce, Los Angeles, CA (US)

(73) Assignee: Moog Inc., East Aurora, NY (US)

( * ) Notice: Subject to any disclaimer, the term of this patent is extended or adjusted under 35 U.S.C. 154(b) by 331 days.

(21) Appl. No.: 15/212,978

(22) Filed: Jul. 18, 2016

(65) Prior Publication Data

US 2017/0129595 A1    May 11, 2017

(51) Int. Cl.
    *B64C 11/02*    (2006.01)
    *B64C 27/00*    (2006.01)

(52) U.S. Cl.
    CPC ...... *B64C 27/001* (2013.01); *B64C 2027/003* (2013.01)

(58) Field of Classification Search
    CPC ......... B64C 2027/003; B64C 2027/004; F05D 2260/96; F05D 2270/334; F05D 2270/304
    See application file for complete search history.

(56) References Cited

U.S. PATENT DOCUMENTS

| | | | |
|---|---|---|---|
| 7,958,801 B2 * | 6/2011 | Frederickson | B06B 1/16 209/367 |
| 8,090,482 B2 * | 1/2012 | Jolly | B64C 27/001 701/3 |
| 8,403,643 B2 * | 3/2013 | Welsh | B64C 27/001 416/145 |
| 8,435,002 B2 | 5/2013 | Jolly et al. | |
| 8,920,125 B2 | 12/2014 | Welsh | |
| 2015/0203196 A1 | 7/2015 | Heverly et al. | |
| 2016/0195161 A1 * | 7/2016 | Hunter | B64C 27/001 74/570.1 |

* cited by examiner

*Primary Examiner* — Ninh H. Nguyen
(74) *Attorney, Agent, or Firm* — Harter Secrest & Emery LLP

(57) ABSTRACT

An improved vibration control actuation system for a rotary-wing aircraft having a plurality of rotor blades mounted to a rotor hub and driven about a central axis of rotation at an operational speed and in a rotational direction relative to a non-rotating body of the aircraft comprising a vibration control frame adapted to be mounted to the hub and to rotate relative to the hub about the central axis in a rotational direction opposite to the rotational direction of the hub, a frame motor configured to rotate the frame about the central axis, the frame supporting first and second motors configured to rotate first and second masses about first and second axes not concentric with the central axis, and a controller for receiving input signals and outputting command signals to the first and second motors.

16 Claims, 3 Drawing Sheets

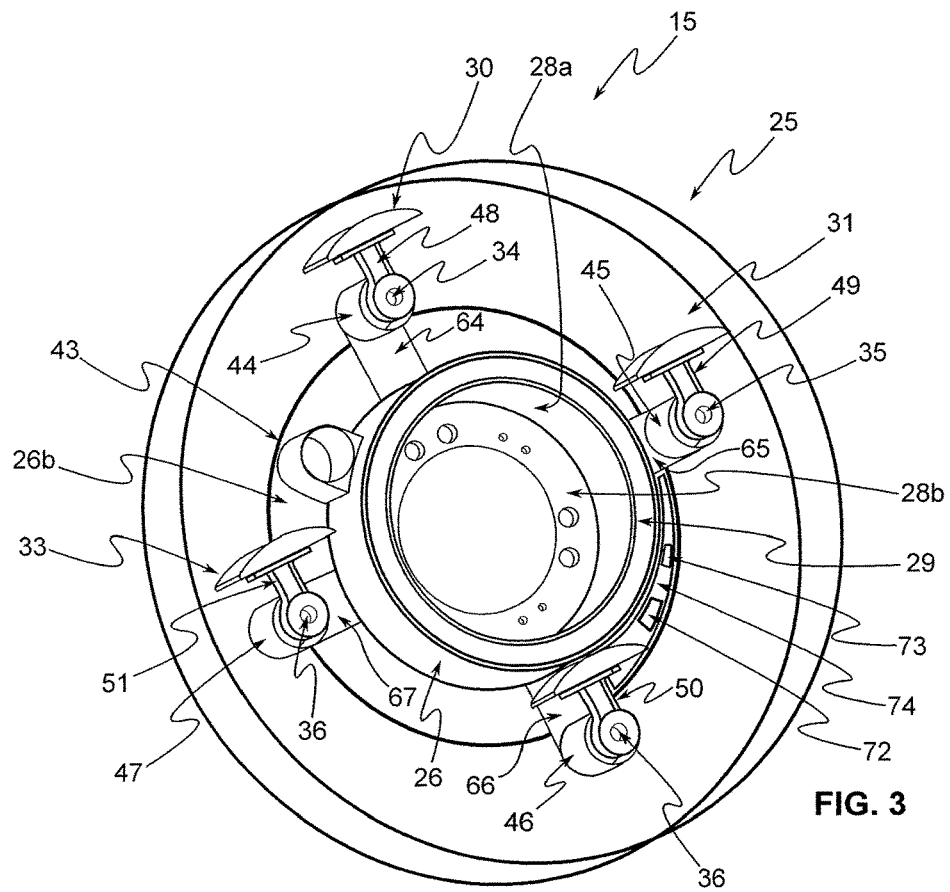
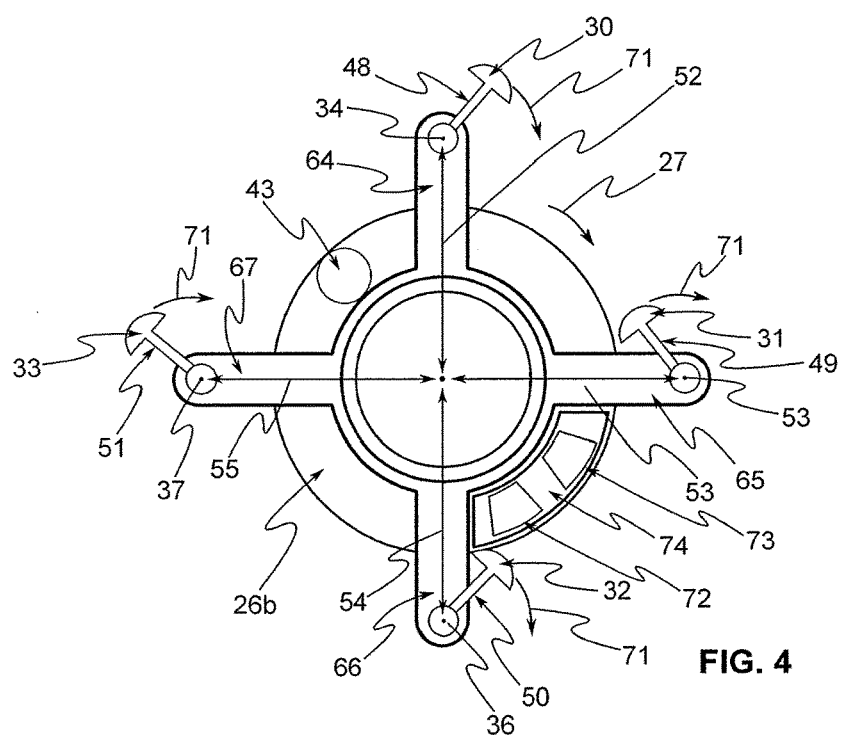

HUB MOUNTED VIBRATION SUPPRESSION SYSTEM

TECHNICAL FIELD

The present invention relates generally to the field of rotary wing aircraft vibration control systems, and more particularly to a rotary-wing aircraft hub mounted vibration suppression system.

BACKGROUND ART

Active counter-vibration devices have been used in rotary-wing aircraft, such as helicopters and tiltrotors, to oppose and cancel high levels of vibration transmitted from the rotor to the fuselage. If such vibrations are not suppressed, they can lead to structural fatigue and may be transmitted to other areas and systems of the helicopter.

Hub mounted vibration control systems are used to suppress vibrations more proximate to the source of the vibration, namely at the main rotor system. The rotor system of a conventional helicopter drives a plurality of rotor blades that are subject to numerous aerodynamic loads. Mast or hub mounted vibration isolation systems suppress vibrations at a location proximate to the source, as opposed to active vibration control systems that may be used to reduce or suppress vibrations at locations more remote from the main rotor system.

U.S. Pat. No. 8,920,125, entitled "Dual Frequency Hub Mounted Vibration Suppressor System," issued Dec. 30, 2014, is directed to a hub mounted vibration suppression system that includes an annular electric motor system defined about the axis of rotation of the main rotor system and a control system in communication with the annular electric motor system to independently control rotation of at least two masses about the axis of rotation of the main rotor system to reduce in-plane vibration of the rotating system. This patent is also directed to a method of reducing vibrations in a rotary-wing aircraft main rotor system that includes independently rotating a multiple of independently rotatable masses disposed about the axis of rotation defined by the main rotor system and controlling a relative angular position of the independent rotatable masses to reduce the vibrations of the main rotor system.

U.S. Pat. No. 8,435,002, entitled "Helicopter Vibration Control System and Rotating Assembly Rotary Forces Generators for Cancelling Vibrations," issued May 7, 2013, is directed to a rotary blade rotating hub mounted rotating assembly vibration control system that includes a first imbalance mass concentration rotor, a second imbalance mass concentration rotor, a third imbalance mass concentration rotor, and a fourth imbalance mass concentration rotor, each of which have center axis rotation that is centered on the rotating assembly center axis of rotation.

U.S. Patent Application Publication No. 2015/0203196, entitled "Active Vibration Control System With Non-Concentric Revolving Masses," is directed to vibration control system for a rotor hub having unbalanced weights each rotating about an axis non-concentric with the rotor hub axis.

DISCLOSURE OF THE INVENTION

With parenthetical reference to the corresponding parts, portions or surfaces of the disclosed embodiment, merely for purposes of illustration and not by way of limitation, an improved vibration control actuation system (15) is provided for a rotary-wing aircraft (16) having a plurality of rotor blades (21) mounted to a rotor hub (22) and driven about a central axis of rotation (20) at an operational speed and in a rotational direction (24) relative to a non-rotating body (18) of the aircraft comprising: a vibration control frame (26, 28) adapted to be mounted to the rotor hub and operationally configured to rotate relative to the rotor hub about the central axis in a rotational direction (27) opposite to the operational rotational direction of the rotor hub; a frame motor (43) configured to rotate the vibration control frame about the central axis in the rotational direction opposite to the operational rotational direction of the rotor hub; the vibration control frame supporting a first motor (44) and a first mass (30), the first motor configured to rotate the first mass relative to the vibration control frame about a first axis (34) that is not concentric with the central axis; the vibration control frame supporting a second motor (46) and a second mass (32), the second motor configured to rotate the second mass relative to the vibration control frame about a second axis (36) that is not concentric with the central axis and is not concentric with the first axis; and a controller (72) for receiving input signals and outputting command signals to the first motor and the second motor to control the rotational speed and rotational position of the first mass and the second mass, respectively.

The vibration control frame may comprise an attachment element (28) fixed to the rotor hub and a turning element (26) configured to rotate relative to the attachment element about the central axis. The system may further comprise a bearing (29) between the attachment element and the turning element. The turning element may support the frame motor, the attachment element may comprise a ring gear (68), and the frame motor may comprise a drive gear (69) in engagement with the ring gear.

The controller may be configured to receiving input signals and to output command signals to the frame motor (43) to control the rotational speed of the vibration control frame (26) relative to the rotor hub (22). The system may further comprise a sensor (73) for measuring vibration and/or rotor shaft speed and providing input to the controller.

The vibration control frame may support a third motor (45) and a third mass (31), the third motor configured to rotate the third mass relative to the vibration control frame about a third axis (35) that is not concentric with the central axis and is not concentric with the first or second axis; and the vibration control frame may support a fourth motor (47) and a fourth mass (33), the fourth motor configured to rotate the fourth mass relative to the vibration control frame about a fourth axis (37) that is not concentric with the central axis and is not concentric with the first, second or third axis. The first mass and the second mass may be rotated in the same direction (71) and in the same phase and may form a first mass pair, and the third mass and the fourth mass may rotate in the same direction (71) and in the same phase and form a second mass pair.

The first mass and the second mass may each have a center of mass located a selected distance from the first axis of rotation and the second axis of rotation, respectively. The first mass and the second mass may be rotationally connected to the vibration control frame by support arms (48, 50) of equal length. The first mass and the second mass may rotate in the same direction (71). The first axis and the second axis of rotation may be parallel to the central axis of rotation. The frame motor may comprise a geared drive system. The frame motor, the first motor and the second motor may each comprise a rotary electric motor. The controller may be supported by and rotate with the vibration control frame. The system may further comprise a slip ring configured to provide input signals to the controller.

BRIEF DESCRIPTION OF THE DRAWINGS

FIG. 3 is an enlarged perspective view of the vibration suppression system shown in FIG. 2.

FIG. 4 is a schematic view of the vibration suppression system shown in FIG. 3.

DESCRIPTION OF THE PREFERRED EMBODIMENTS

Figure 1:
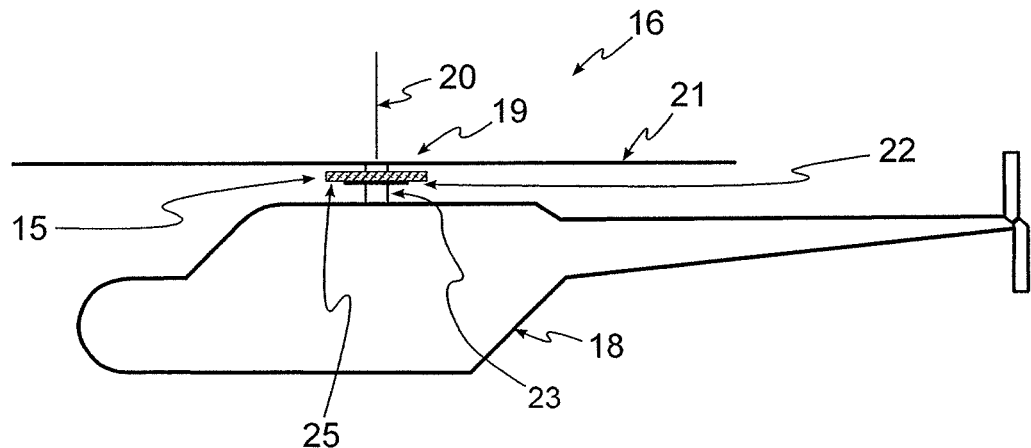
FIG. 1 is an illustration of an embodiment of an improved hub mounted vibration suppression system.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., crosshatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

FIG. 1 is a schematic illustration of helicopter 16 having airframe 18 and main rotor system 19 that is driven about center axis of rotation 20. Main rotor system 19 includes plurality of rotor blades 21a, 21b, 21c mounted to rotor hub 22. Rotor hub 22 is driven about center axis of rotation 20 by main rotor shaft 23, which is driven through a main rotor gear box by one of more aircraft engines. Main rotor shaft 23 and hub 22 rotate in rotational direction 24 at an operational rotational frequency about center axis of rotation 20. Although a helicopter is shown and described in this embodiment, vibration control actuation system 15 may be used with other types or configurations of rotary-wing aircraft or rotor-craft.

Figure 2:
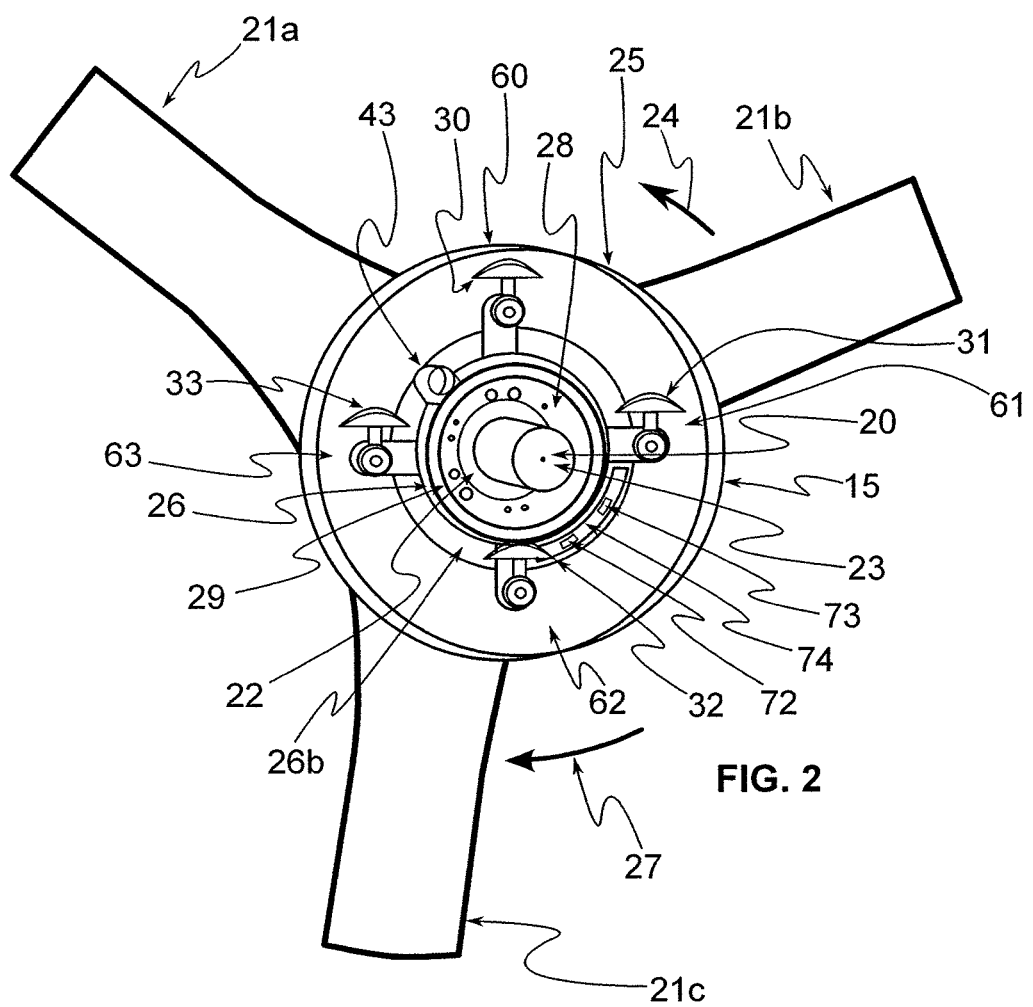
FIG. 2 is a partial cut-away and perspective view of the hub and vibration suppression system shown in FIG. 1.

As shown in FIGS. 1-5, vibration control actuation system 15 is mounted to hub 22 and generally includes hub attachment 28, annular bearings 29, turntable 26 and four rotating unbalanced mass systems 60-63, all contained within annular housing 25. FIG. 2 is a partial cut-away view that illustrates the main elements of vibratory suppression system 15. In the embodiment shown in FIG. 1, housing 25, including turntable 26, is mounted below rotor blades 21. However, as shown in FIG. 6, in an alternative embodiment housing 25 and turntable 26 may be mounted above rotor blades 21.

Figure 5:
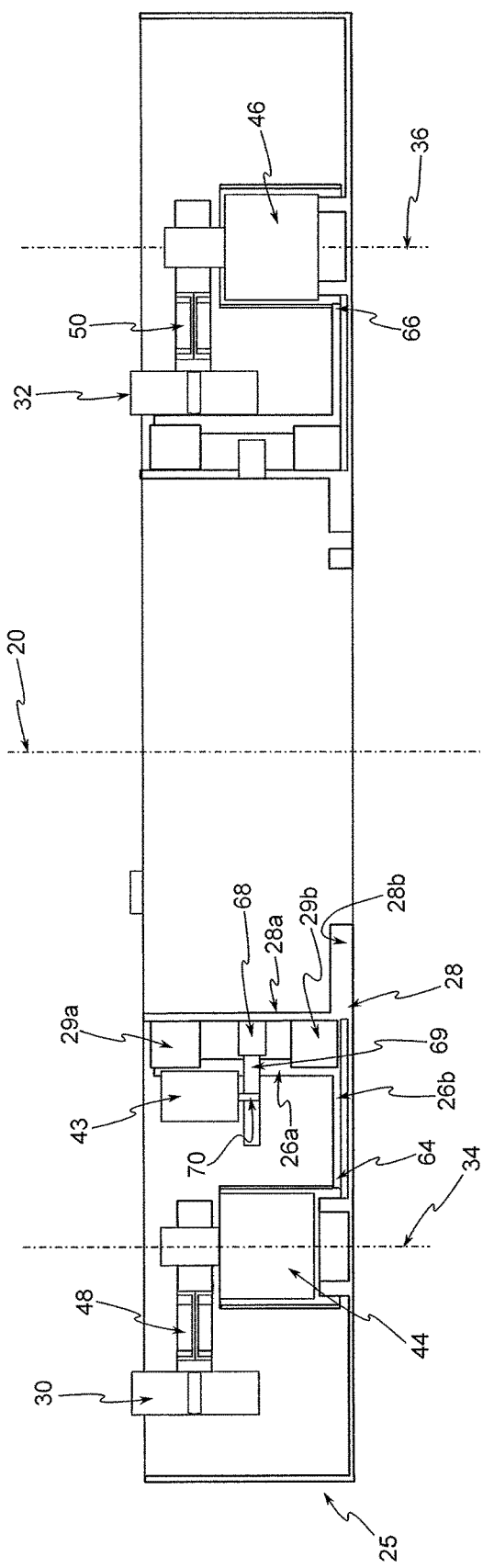
FIG. 5 is a partial cross-sectional view of the vibration suppression system shown in FIG. 3.
Figure 6:
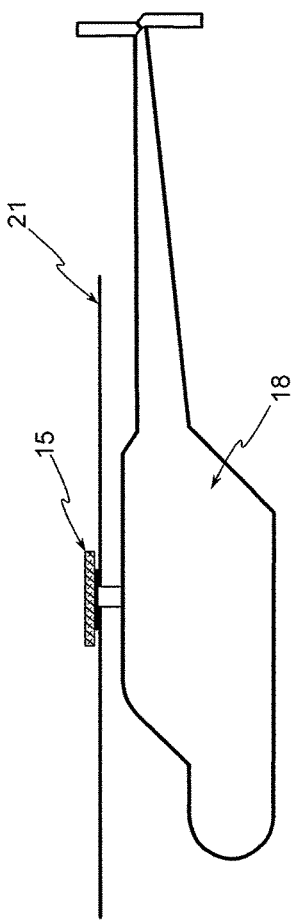
FIG. 6 is an illustration of a second embodiment of the system shown in FIG. 1.

As shown in FIGS. 3-5, hub attachment 28 comprises cylindrical portion 28a orientated about center axis 20, ring spur gear 68 on the exterior surface of cylindrical portion 28a and having external gear teeth, and annular flange portion 28b, which is bolted to hub 22. Ring gear 68 is a ring-shaped annular structure oriented about center axis 20. Mounting element 28 is fixed to and rotates with hub 22.

Turntable 26 comprises cylindrical portion 26a, orientated coaxially with cylindrical portion 28a of hub attachment 28 about center axis 20, annular flange portion 26b, and four radially-extending mass system support arms 64, 65, 66 and 67. As shown, annular flange portion 26b of turntable 26 rotationally supports turntable motor 43 and mass systems 60-63.

Upper and lower bearings 29a and 29b act between the outer cylindrical surface of cylindrical portion 28a of hub attachment 28 and the opposed inner cylindrical surface of cylindrical portion 26a or turntable 26. Ring gear 68 is disposed axially between upper bearing 29a and lower bearing 29b. As shown, turntable 26 is configured to rotate about center axis 20 on upper and lower bearings 29a and 29b. Thus, turntable 26 is mounted on hub 22 of helicopter rotor system 19 by means of rolling bearings 29 such that turntable 26 is rotatable relative to of hub attachment 28 and rotor hub 22. Turntable 26 is coaxial with center axis of rotation 20 of main rotor shaft 23 and rotor hub 22 of helicopter rotor system 19.

Turntable 26 rotationally supports turntable motor 43 and mass systems 60-63. As shown in FIG. 5, output shaft 70 of motor 43 is connected to external spur gear 69, which has teeth in meshed engagement with the external teeth of ring gear 68 of hub attachment 28. In this embodiment, gear 69 is a pinion gear and ring gear 68 is a bull gear. However, other gear and gear train configurations may be used to drive turntable 26 about axis 20 relative to rotor hub 22.

In operation, rotation of motor shaft 70 about its motor axis, which is parallel to center axis 20, causes rotation of gear 69. With the threaded connection between gear 69 and ring gear 68, rotation of gear 69 causes rotation of turntable 26 about center axis 20 relative to rotor hub 22. Turntable motor 43 is configured to rotate turntable 26 about center axis 20 relative to rotor shaft 23 and hub 22 in rotational direction 27 that is opposite to rotational direction 24 and at an operational frequency or speed that is the same as the operational frequency or speed of rotor hub 22. Motors 43-47 may be electro-mechanical drives. For example, motors 43-47 may be brushless permanent magnet electric motors consisting of a rotor with permanent magnets, and a stator with coils.

As shown in FIGS. 3 and 4, tabs 64, 65, 66 and 67 extending from annular flange portion 26b of turntable 26 support four non-concentric mass systems or weights 60, 61, 62 and 63, respectively, that are equally spaced about the outer circumference of turntable 26. Mass systems 60, 61, 62 and 63 comprise motors 44, 45, 46 and 47, arms 48, 49, 50 and 51, and masses 30, 31, 32 and 33, respectively. Masses 30-33 are rotated by motors 44-47 about four different eccentric axes 34, 35, 36 and 37, respectively. The axis of rotation 34-37 of each unbalanced mass 30-33, respectively, is non-concentric with center axis 20, is not concentric with any other mass axis or rotation, but is parallel to center axis 20 and the other mass axes of rotation, and is offset from center axis 20 a fixed radial distance 52, 53, 54 and 55, respectively.

Unbalanced masses 30-33 are configured and commanded in pairs with each mass' axis of rotation symmetrically orientated about center axis 20. Thus, each mass 30-33 has a center of mass that is located a radial distance from its axis of rotation 34-37, and actuators 44-47 rotate the four non-concentric masses 30, 31, 32 and 33 at the end of support arms 48, 49, 50 and 51, respectively, of equal length about four separate eccentric axes 34, 35, 36 and 37, respectively, that are parallel to central axis 20 of rotor hub 22 but are offset from each other and radially offset the same distance 52, 53, 54 and 55 from central axis 20 of rotor hub 22.

Under normal operation masses 30-33 are all rotated in the same direction 71. Furthermore, masses 30 and 32 are rotated in the exact same phase, and form a first mass pair M1. Masses 31 and 33 are rotated in the exact same phase, and form a second mass pair M2. This insures that the torque on turntable 26 about main hub axis 20 from mass 30 of the first pair M1 cancels the torque on turntable 26 about main hub axis 20 from mass 32 of the first pair M1. Similarly, the torque on turntable 26 about main hub axis 20 from mass 31 of the second pair M2 cancels the torque on turntable 26 about main hub axis 20 from mass 33 of the second pair M2.

The first mass pair M1 produces a net rotary force on turntable 26, and the phase of this net rotary force matches the phase of masses 30 and 32. Similarly, the second mass pair M2 produces a separate net rotary force on turntable 26, but with a phase equal to the phase of masses 31 and 33. The first mass pair's rotary force vector and the second mass pair's rotary force vector combine to make a final rotary force on the turntable which varies in magnitude based upon the phase difference between the first mass pair M1 and the second mass pair M2. In other words, by having the two pairs of masses (30/32 and 31/33) rotate in the same direction, the magnitude of the resulting force vector can be adjusted by varying the phase difference between the first pair of masses (30/32) versus the second pair of masses (31/33). By varying the phase difference of the rotation of the net rotary force of the first pair of masses (30/32) and the net rotary force of the second pair of masses (31/33) allows for adjustment of the resulting force vector on hub 22. No matter what the phase difference between 30/32 and 31/33, the torque on turntable 26 about hub axis 20 will always being zero when the system is in steady state. Thus, turntable actuator or motor 43 only needs to provide a torque to overcome drag in steady state.

While turntable 26 rotates, it does not rotate with hub 22. Rather, turntable 26 is configured to rotate about central axis 20 opposite the rotation of hub 22, such that turntable 26 is stationary relative to the body or airframe 18 of helicopter 16. Since turntable 26 spins opposite of the helicopter mast and hub 22 at the same rate, it keeps mass actuators 44-47 in the same reference frame as body 18 and ground. Motor 43 and gear 69 mounted on turntable 26, in geared relationship with ring gear 68 on hub attachment 28, drives rotation of turntable 26 relative to hub 22 about central axis 20 of hub 22, thereby maintaining its stationary position relative to the body of the helicopter.

Thus, rotation of each unbalanced mass 30-33 about its particular axis 34-37 causes an oscillatory shear force on hub 22 in the plane of rotation. The amplitude of the shear force output is controlled by the rotational speed of masses 30-33, and indexing the positions of each masses 30-33 relative to each other, while the phase of the shear force output is adjusted by equally indexing each mass pair relative to each other.

As shown in FIGS. 2-4, flange portion 26*b* of turntable 26 supports electronics and printed circuit board assembly 74 for vibration control actuation system 15, including microprocessor controller 72 and sensor package 73. In this embodiment, controller 72 is located on annular plate 26*b* of turntable 26 and is configured to automatically control the operation of motors 43-47. Controller 72 includes feedback sensors 73, which in this embodiment are co-located on annular flange 26*b* of turntable 26 with controller 72. However, sensors may be located on rotor shaft 23, on hub 22 and/or on fuselage or airframe 18 to provide rotor shaft speed or operational frequency and vibration feedback data. Such sensors may also be installed in other locations. Based on such sensor data, controller 72 controls the operation of vibration control actuation system 15 based on measurements of vibrations transmitted into and through airframe 18 and controls frame motor 43 based on rotor shaft 23 speed or operational frequency. Controller 72 may alternatively control operation of vibration control actuation system 15 based on other data, such as airspeed, blade pitch angle, amount of rotor thrust, and/or similar aircraft parameters. Although not shown, slip rings provide input and output signals across the rotary gap to controller 72 and actuators 44-47 mounted on turntable 26.

To create the necessary rotational force, all four masses 30-33 rotate in unison at a frequency which is equivalent to a 3P rotating speed in terms of aircraft rotor speed. Turntable 26 spins in direction 27 opposite of aircraft rotor hub direction 24 and speed (7.12 Hz), thus keeping electric motors 44-47 in the same reference frame as the non-rotating body of the aircraft. With turntable 26, the total rotational speed 4P to masses 30-33 is avoided as turntable 26 provides a support structure for electric motors 44-47 and masses 30-33 and imparts a 1P to the whole actuator.

While the presently preferred form of the improved vibration suppression system has been shown and described, and several modifications thereof discussed, persons skilled in this art will readily appreciate that various additional changes and modifications may be made without departing from the scope of the invention, as defined and differentiated by the claims.

What is claimed is:

1. A vibration control actuation system for a rotary-wing aircraft having a plurality of rotor blades mounted to a rotor hub and driven about a central axis of rotation at an operational speed and in a rotational direction relative to a non-rotating body of the aircraft comprising:
   a vibration control frame adapted to be mounted to said rotor hub and operationally configured to rotate relative to said rotor hub about said central axis in a rotational direction opposite to said operational rotational direction of said rotor hub;
   a frame motor configured to rotate said vibration control frame about said central axis in said rotational direction opposite to said operational rotational direction of said rotor hub;
   said vibration control frame supporting a first motor and a first mass, said first motor configured to rotate said first mass relative to said vibration control frame about a first axis that is not concentric with said central axis;
   said vibration control frame supporting a second motor and a second mass, said second motor configured to rotate said second mass relative to said vibration control frame about a second axis that is not concentric with said central axis and is not concentric with said first axis; and
   a controller for receiving input signals and outputting command signals to said first motor and said second motor to control the rotational speed and rotational position of said first mass and said second mass, respectively.

2. The system set forth in claim 1, wherein said vibration control frame comprises an attachment element fixed to said rotor hub and a turning element configured to rotate relative to said attachment element about said central axis.

3. The system set forth in claim 2, and further comprising a bearing between said attachment element and said turning element.

4. The system set forth in claim 2, wherein said turning element supports said frame motor, said attachment element comprises a ring gear, and said frame motor comprises a drive gear in engagement with said ring gear.

5. The system set forth in claim 1, wherein said controller is configured to receiving input signals and to output command signals to said frame motor to control the rotational speed of said vibration control frame relative to said rotor hub.

6. The system set forth in claim 1, and further comprising a sensor for measuring vibration and/or rotor shaft speed and providing input to said controller.

7. The system set forth in claim 1, wherein said vibration control frame supports a third motor and a third mass, the third motor configured to rotate the third mass relative to the vibration control frame about a third axis that is not concentric with the central axis and is not concentric with the first or second axis; and the vibration control frame supporting a fourth motor and a fourth mass, the fourth motor configured to rotate the fourth mass relative to the vibration control frame about a fourth axis that is not concentric with the central axis and is not concentric with the first, second or third axis.

8. The system set forth in claim 7, wherein said first mass and said second mass are rotated in the same direction and in the same phase and form a first mass pair, and said third mass and said fourth mass rotate in the same direction and in the same phase and form a second mass pair.

9. The system set forth in claim 1, wherein said first mass and said second mass each have a center of mass located a selected distance from said first axis of rotation and said second axis of rotation, respectively.

10. The system set forth in claim 1, wherein said first mass and said second mass are rotationally connected to said vibration control frame by support arms of equal length.

11. The system set forth in claim 1, wherein said first mass and said second mass rotate in the same direction.

12. The system set forth in claim 1, wherein said first axis and said second axis of rotation are parallel to said central axis of rotation.

13. The system set forth in claim 1, wherein said frame motor comprises a geared drive system.

14. The system set forth in claim 1, wherein said frame motor, said first motor and said second motor each comprise a rotary electric motor.

15. The system set forth in claim 1, wherein said controller is supported by and rotates with said vibration control frame.

16. The system set forth in claim 15, and further comprising a slip ring configured to provide input signals to said controller.

* * * * *

UNITED STATES PATENT AND TRADEMARK OFFICE
CERTIFICATE OF CORRECTION

PATENT NO. : 10,308,355 B2
APPLICATION NO. : 15/212978
DATED : June 4, 2019
INVENTOR(S) : Arturo M. Arce Page 1 of 1

It is certified that error appears in the above-identified patent and that said Letters Patent is hereby corrected as shown below:

On the Title Page

Item (60) Column 1, after (65) please add:
"Related U. S. Application Data
Provisional Application No. 62/200,273, filed on August 3, 2015."

Signed and Sealed this
Third Day of September, 2019

Andrei Iancu
*Director of the United States Patent and Trademark Office*